United States Patent Office 3,210,175
Patented Oct. 5, 1965

3,210,175
METHOD OF INCREASING FRUIT YIELD
Geoffrey E. Barnsley, Canterbury, Kent, England, assignor to Shell Oil Company, New York, N.Y., a corporation of Delaware
No Drawing. Filed Apr. 25, 1963, Ser. No. 275,507
Claims priority, application Great Britain, Apr. 27, 1962, 16,176/62
3 Claims. (Cl. 71—2.5)

This invention relates to a method for increasing the yield of the fruit of plants. As used herein, the term "fruit" is used broadly, to include any specialized product of plant growth that is useful to man and/or animals, and includes not only fruit as the term ordinarily is used, but vegetables as the term ordinarily is used, grains, seeds, nuts, and other products resulting from fertilization of a specialized organ such as a flower, and specialized growth areas of plants which are commonly considered as fruit, or vegetables, or as edible products, such as tubers, corms, bulbs, enlarged root structures, and the like.

In accordance with this invention, it has been found that the development of fruit is stimulated by contacting the plant with an adenine compound of the formula:

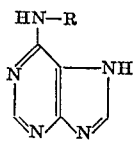

(I)

wherein R is benzyl. It will be appreciated that compounds of the above formula can exist in the form of tautomeric isomers having the equivalent structures represented by the formulae:

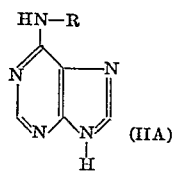 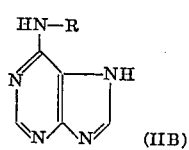

By use of one of the two formulae, it is not intended to exclude the compounds of the other formula; particularly, reference to one of the two formulae is not intended to exclude the presence of the tautomeric isomer in the material actually used to treat plants according to this invention.

These adenine compounds are amphoteric, and readily form salts with either acids or bases. The salts of these adenine compounds with non-phytotoxic acids, such as the acetate salts, and bases such as the sodium and potassium salts, may be used as the source of the adenine compound in treating plants. Or, the adenine compound may be in the form of its amide, which is believed to hydrolyze and thus be converted to the free amphoteric adenine compound upon the surface of the plant.

When a plant is treated with $N^6$-benzyladenine, the yield of fruit is increased. The mode of action by which such compounds act to stimulate the growth and development of fruit has not been clearly elucidated. On the basis of evidence at hand, it appears that the compounds act to delay maturation of a plant—they maintain and extend the period of plant development during which the growth of the fruit is the primary physiological phenomenon that is occurring, thus increasing the yield of fruit. Also, or alternatively, it may be found that in cases such as malting barley and sugarbeets a favorable change in composition of the fruit can be secured, which results from an increase in the carbon/nitrogen ratio in the fruit resulting from the treatment of the plant with the adenine compound.

Accordingly, the present invention provides a method for increasing the useful yield of fruit which comprises treating an actively growing plant with an adenine compound of the kind which is described in Formula I (the tautomeric forms being described in Formulae IIA and IIB).

Only a small amount of the adenine compound is required to attain the desired effect. For example, as little as 0.1 ounce of the compound per acre of the crop can be used, while it will seldom be necessary to use more than about 32 ounces of the compound per acre of crop. Generally, it will be found that a dosage within the range of from about 0.5 to about 4 ounces per acre of crop will be optimum.

In general, the best results are obtained by treating the plants during the period of early, active development and growth of the fruit, although improvement in the yield of fruit can be obtained by earlier treatment of the plant, or treatment during the later stages of development and growth of the fruit.

The adenine compounds are most effectively applied in the form of dilute solutions or suspensions in water sprayed onto the surfaces of the foliage of the plants. In many cases, the alkali metal, particularly the sodium, salt of the adenine compound is sufficiently soluble in water. In such cases, a solution of the salt may be used. In these or other cases, it may be more convenient to employ an acid salt which is soluble in a liquid other than water. For example, the salts of the adenine compounds with lower alkane carboxylic acids, particularly the acetic acid salts, are soluble in lower alcohols, particularly ethanol. In this latter, usually preferable, case, the adenine compound is dissolved in at least sufficient acetic acid to form the salt (an excess of acid can be used, if desirable) and the solution is diluted with ethanol. Since some water can be present, aqueous acetic acid solutions can be used, although it is preferred to maintain the water content low to prevent precipitation of the salt at low temperatures. It has been found that the stability of these solutions at low temperatures can be increased, if necessary, by increasing the acid concentration. Thus a mixture of 1.2 percent by weight of $N^6$-benzyladenine, 6.5 percent by weight acetic acid and 92.3 percent by weight ethanol has been found stable—i.e., none of the adenine salts precipitates—at temperatures above about 50° F. but tends to be somewhat unstable below those temperatures. Similar compositions which are stable to 32° F. or lower are formed by increasing the acetic acid concentration. For example, the acetic acid concentration can be increased to as much as 20 to 30 percent by weight, or even more, to increase the stability of the formulation.

Alternatively, a solubilizing agent may be used, useful non-toxic solubilizing agents being the higher fatty acid monoesters of polyoxyethylene sorbitan, such as the monostearate ester and mixtures of the monostearate and monopalmitate esters.

Emulsifiers also can be added to improve the wetting properties of the formulation. Suitable non-toxic emulsifiers include the higher fatty acid monoesters of polyoxyethylene sorbitan already described as solubilizing agent, or higher fatty and monoesters of glycerine, such as glyceryl monostearate and glyceryl monooleate.

The concentration of the adenine compound is adjusted to give the necessary dosage, per acre of crop, taking into account the amount of the composition to be applied.

The plants may be treated by contacting them with a single application of the adenine compound formulation, or the plants can be treated with two or more applications of the formulation, with from one day to several days to several weeks time elapsing between applications.

The formulation of the adenine compound also can suitably contain other chemicals such as insecticides, herbicides, fungicides, nematicides, or molluscicides to provide multipurpose treatment of the plants.

The invention is illustrated by the following example, which demonstrate application of the method of this invention in particular instances.

Example I

Growing barley plants (Proctor strain) were treated approximately one month before harvesting with 0.25 pound per acre of $N^6$-benzyladenine in the form of an aqueous solution. The results obtained were as follows:

| Treatment | Grain yield (hundredweight/acre) | |
|---|---|---|
| | Fresh | Dry |
| $N^6$-benzyladenine | 38.5 | 31.6 |
| Control (unsprayed) | 34.8 | 28.6 |

It can be seen that $N^6$-benzyladenine increased the grain yield by approximately 10% in both fresh and dry matter.

Example II

Growing barley plants (Rika strain) were sprayed with a 0.79% weight/volume of an aqueous solution of $N^6$-benzyladenine at dosage rates of 0.125 and 0.25 pound per acre, approximately one month before harvest. After harvest the crop yields were estimated by plucking at random 300 ears of barley per experimental plot, weighing them, and expressing the results in grams per 300 ears. Control experiments were also made. The results obtained were as follows:

TOTAL YIELD, GRAMS PER 300 EARS OF BARLEY (FRESH WEIGHT)

| Control | $N^6$-benzyladenine treatment | |
|---|---|---|
| | 0.125 lb./acre | 0.25 lb./acre |
| 510 | 558 | 560 |
| 547 | 560 | 573 |
| 537 | 528 | 573 |
| *531 | *545 | *569 |

*Mean.

From the mean results it can be seen that treated crops gave a yield increase over the untreated crop of up to approximately 7%.

Example III

Growing wheat plants were sprayed at dosage rates of 0.125 and 0.25 pound per acre with an aqueous solution of $N^6$-benzyladenine, approximately 1 month before harvest. After harvest, the crop yields were estimated by plucking at random 50 ears of wheat per experimental plot, weighing them, and expressing the results in grams per 50 ears. Control experiments were also carried out. The following table summarizes the increase in crop yield obtained from crops treated with $N^6$-benzyladenine.

TOTAL YIELD, GRAMS PER 50 EARS OF WHEAT (FRESH WEIGHT)

| Control | $N^6$-benzyladenine treatment | |
|---|---|---|
| | 0.125 lb./acre | 0.25 lb./acre |
| 115 | 147 | 155 |
| 118 | 145 | 172 |
| 119 | 141 | 130 |
| *117 | *144 | *152 |

*Mean.

From the mean results it can be seen that increase in crop yields vary from approximately 20 to 30%.

Example IV

Growing potato plants were sprayed three times at 9 day intervals, with an aqueous solution of $N^6$-benzyladenine at a dosage rate of ½ ounce per acre, the third spray being applied approximately one month before harvesting. The following results give mean values of the crop yield in hundredweight per acre. Control experiments were also carried out.

TOTAL YIELD OF POTATOES IN HUNDREDWEIGHT/ACRE

Control _____ 240
Treated Crop _____ 268

As a result of the treatment with $N^6$-benzyladenine an increase in crop yield of approximately 11% was produced.

Example V

Growing sugar beet plants were sprayed with a 0.79% weight/volume solution of $N^6$-benzyladenine in aqueous propylene glycol at dosage rates ranging between $\frac{1}{20}$ and 2 pounds per acre, approximately one month before harvest. After harvest there was no significant increases in crop yield at this dosage range, but there was a significant increase in the carbon/nitrogen ratio of the harvested sugar beet. The carbon/nitrogen ratio increase was assessed by measuring the α-amino-acid nitrogen content of the sugar obtained from the sugar beet and is expressed in the following table in milligrams of nitrogen per 100 grams of sugar. Control experiments were also carried out in which the sugar beet plants were sprayed with propylene glycol alone. The combined results are summarized below.

| Application rate (pounds per acre) | α-Amino-acid nitrogen content (milligrams/100 grams of sugar) | |
|---|---|---|
| | Benzyl adenine treated crop | Control |
| $\frac{1}{20}$ | 171.5 | 182.0 |
| $\frac{2}{20}$ | 182.0 | 174.0 |
| $\frac{3}{20}$ | 168.0 | 176.0 |
| $\frac{4}{20}$ | 160.0 | 165.0 |
| ½ | 151.0 | 173.0 |
| 1 | 159.0 | 159.0 |
| 1½ | 143.0 | 180.0 |
| 2 | 142.0 | 151.0 |

I claim as my invention:

1. A method for increasing the useful yield of fruit which comprises treating an actively growing plant with an effective amount of $N^6$-benzyladenine.

2. A method for increasing the useful yield of barley which comprises treating an actively growing plant with an effective amount of $N^6$-benzyladenine.

3. A method for increasing the useful yield of wheat which comprises treating an actively growing plant with an effective amount of $N^6$-benzyladenine.

References Cited by the Examiner

UNITED STATES PATENTS 2,966,488  12/60  Shive et al. _____ 71—2.5 X
3,112,192  11/63  Feichtmeir et al. _____ 71—2.5
3,118,753  1/64   Shive et al. _____ 71—2.5

JULIAN S. LEVITT, *Primary Examiner.*

Dedication

3,210,175.—*Geoffrey E. Barnsley*, Canterbury, Kent, England. METHOD OF INCREASING FRUIT YIELD. Patent dated Oct. 5, 1965. Dedication filed Dec. 12, 1975, by the assignee, *Shell Oil Company*.
Hereby dedicates to the Public the entire remaining term of said patent.
[*Official Gazette February 10, 1976.*]